Patented Aug. 28, 1934

1,971,966

UNITED STATES PATENT OFFICE 1,971,966

PROCESS OF MANUFACTURING POSITIVE SENSITIZED PAPER

Sueo Sakurai, Koishikawa-Ku, Tokyo, Japan, assignor to Zaidan Hojin Rikagaku Kenkyujo, Tokyo, Japan No Drawing. Application March 10, 1928, Serial No. 260,807. In Japan May 14, 1927

4 Claims. (Cl. 95—7)

This invention relates to a process of manufacturing positive sensitized paper, consisting in coating paper with either an aqueous solution of a metal-compound of a diazotized aminodiphenylamine, or of derivatives of these compounds, mixed with an organic acid and either with or without the addition of an azo-colour component and in drying the same and the invention relates also to the product thereof.

The object of the invention is to obtain a sensitized paper which will stand long preservation and which, by a simple process, will at once produce a clear positive copy of the original picture.

To fully explain the invention, a case may be explained in which tetrazo-pp'-diphenylamine is used. This compound is converted into a stable metal salt, of which an aqueous solution is mixed with an organic acid, such as tartaric acid, and either with or without the addition of an azo-colour component, such as naphthol sulphonic acid. Any suitable paper coated on one side with this solution and dried, if kept in a dark place and protected from moisture and injurious gases, may be preserved for a great length of time. This paper, with a picture placed upon its sensitized side, is then exposed to light, when the tetrazo-compound in that part only which has been acted upon by light is decomposed and loses the property of combining with the azo-colour component, so that in the case where an azo-colour component has been added it only remains either to soak the exposed paper in an alkaline solution or to bring it in contact with an alkaline gas. Azo-colour is then developed in that part only which has not been acted upon by light, and a clear positive reprint of the original is at once produced.

The aim of the invention being to obtain a sensitized paper which will stand long preservation and which, by a simple process, will at once produce a clear positive copy of the original picture, this invention enables us to do away with all the defects of the ordinary blue print hitherto in use.

In illustration of the preparation of a metal salt of tetrazo-pp'-diphenylamine used in this invention, the following instance may be cited: 19.9 parts of pp'-diamino-diphenylamine are dissolved in a solution of 40 parts of concentrated hydrochloric acid in 200 parts of water and after bringing it down to a low temperature, tetrazotized with a solution of 14 parts of sodium nitrite in 100 parts of water. On adding 30 parts of aluminium sulphate to the tetrazotized solution, the aluminium salt of tetrazo-pp'-diphenylamine is obtained.

Or, in illustration of the preparation of a metal salt of p-diazo-diphenylamine, the following instance may be cited: 18.4 parts of p-aminodiphenylamine are dissolved in a solution of 20 parts of concentrated hydrochloric acid in 200 parts of water, diazotized, after bringing it down to a low temperature, with a solution of 7 parts of sodium nitrite in 50 parts of water, and 15 parts of aluminium sulphate are added, when the aluminium salt of p-diazo-diphenylamine is obtained.

Examples for the actual process.

*Example I.*—1 part of said aluminium salt of tetrazo-pp'-diphenylamine is dissolved in 100 parts of water and then 1 part of oxalic acid is added. Any suitable paper is coated on one side with the yellow coloured solution thus obtained and dried. The sensitized paper thus got is, with a picture brought into close contact with its sensitized side, exposed to light for a suitable length of time and then soaked in a solution of 5 parts of sodium carbonate and 5 parts of 1-amino-8-naphthol-3.6-disulphonic acid in 100 parts of water, when a blue positive reprint of the original is at once produced.

*Example II.*—1 part of said aluminium salt of tetrazo-pp'-diphenylamine and 2 parts of 1-naphthol-4-sulphonic acid are dissolved in 200 parts of water, to which 2 parts of citric acid are added. Paper coated with this solution and dried is again the required sensitized paper. After being exposed to light, with a picture brought into close contact with it, as before, the paper is soaked in an alkaline solution, say 2% sodium hydrate solution, when a reddish purple positive print is at once produced. Or, more simply, exposure to ammonia gas produces the same result.

*Example III.*—1 part of said aluminium salt of diazo-p-diphenylamine and 1 part of 1-naphthol-3.8-disulphonic acid are dissolved in 200 parts of water, with the addition of 2 parts of tartaric acid. This solution again gives the required sensitized paper. The exposed paper is developed, as in Example 2, with an alkaline solution or gas, and a blue positive print is obtained.

I claim.

1. A process of manufacturing positive sensitized paper, consisting in coating paper with an aqueous solution of aluminium salt of p-diazo-diphenylamine, mixed with an acid, and in drying the same.

2. A process of manufacturing positive sensitized paper, consisting in coating paper with an aqueous solution of aluminium salt of p-diazo-diphenylamine, mixed with an acid and also with the addition of an azo-colour component and in drying the same.

3. A positive sensitized paper which is coated with an aqueous solution of aluminium salt of p-diazo-diphenylamine, mixed with an acid and dried.

4. A positive sensitized paper which is coated with an aqueous solution of aluminium salt of p-diazo-diphenylamine, mixed with an acid and also with the addition of an azo-color component and dried.

SUEO SAKURAI.